(12) United States Patent
Cernasov

(10) Patent No.: US 7,675,429 B2
(45) Date of Patent: Mar. 9, 2010

(54) INTRA-ORAL SIGNAL MODULATOR AND CONTROLLER

(75) Inventor: Andre N. Cernasov, Ringwood, NJ (US)

(73) Assignee: Andrei Cernasov, Ringwood, NJ (US)

(*) Notice: Subject to any disclaimer, the term of this patent is extended or adjusted under 35 U.S.C. 154(b) by 1047 days.

(21) Appl. No.: 11/317,053

(22) Filed: Dec. 27, 2005

(65) Prior Publication Data

US 2006/0287855 A1 Dec. 21, 2006

Related U.S. Application Data

(60) Provisional application No. 60/691,252, filed on Jun. 17, 2005.

(51) Int. Cl.
G09B 21/00 (2006.01)

(52) U.S. Cl. .............. 340/825.19; 340/825.72; 340/825.22; 340/5.1; 340/539.12

(58) Field of Classification Search ........... 340/825.72, 340/825.69, 825.22, 5.1, 539.12; 704/248, 704/208, 249
See application file for complete search history.

(56) References Cited

U.S. PATENT DOCUMENTS

| | | | |
|---|---|---|---|
| 3,883,954 A | 5/1975 | Simmering et al. | |
| 3,983,865 A | 10/1976 | Shepard | |
| 4,112,596 A | 9/1978 | Fletcher et al. | |
| 4,175,338 A | 11/1979 | Takinishi et al. | |
| 4,334,542 A | 6/1982 | Takinishi et al. | |
| 4,355,645 A | 10/1982 | Mitani et al. | |
| 4,605,927 A | 8/1986 | Katz et al. | |
| 4,728,812 A | 3/1988 | Sheriff et al. | |
| 4,783,656 A | 11/1988 | Katz et al. | |
| 4,864,641 A * | 9/1989 | Nakamura | ............... 455/276.1 |
| 5,212,476 A | 5/1993 | Maloney | |
| 5,233,662 A | 8/1993 | Christensen | |
| 5,233,745 A * | 8/1993 | Morita | .................. 29/705 |
| 5,460,186 A | 10/1995 | Buchhold | |
| 5,523,745 A * | 6/1996 | Fortune et al. | ......... 340/825.19 |
| 5,689,246 A * | 11/1997 | Dordick et al. | ........ 340/825.19 |
| 5,828,758 A * | 10/1998 | Byce et al. | .................... 381/70 |
| 6,280,394 B1 | 8/2001 | Maloney et al. | |
| 6,532,383 B2 | 3/2003 | Maloney et al. | |
| 6,598,006 B1 | 7/2003 | Honda et al. | |
| 2007/0243517 A1 * | 10/2007 | Olsen | ......................... 434/365 |

FOREIGN PATENT DOCUMENTS

| | | |
|---|---|---|
| EP | 1297801 | 4/2003 |
| GB | 2259970 | 3/1993 |
| JP | H08-286822 | 11/1996 |
| WO | WO-2003-013402 | 2/2003 |

* cited by examiner

*Primary Examiner*—Vernal U Brown
(74) *Attorney, Agent, or Firm*—Lowe Hauptman Ham & Berner, LLP

(57) ABSTRACT

Methods and apparatus for controlling an external device via at least one signal modulated by movements of a user's tongue, maxillaries and lips may include a mouthpiece comprising a controller and at least one signal emitter and one signal detector. A signal generated by the at least one emitter may be modulated by changes to the geometry of a user's oral cavity and detected by at least one signal detector. The at least one detected signal may be processed by a controller and transmitted to a remote device in order to provide control capability made possible by the degrees of freedom available by manipulation of the geometry of the user's oral cavity.

12 Claims, 15 Drawing Sheets

INTRA-ORAL SIGNAL MODULATOR AND CONTROLLER

CROSS-REFERENCE TO RELATED APPLICATION

This application claims the benefit of U.S. Provisional Patent Application Ser. No. 60/691,252 filed Jun. 17, 2005 entitled "Intra-oral Signal Modulator and Controller."

BACKGROUND

The present disclosure relates to methods and apparatus for controlling external devices through body control and specifically relates to intraoral control devices.

The human muscular system provides people with a wide range of motion in their conduct of every day normal activities. For people with limited physical movement capability, the degrees of freedom available and/or necessary to perform necessary functions may be insufficient or severely curtailed.

Devices may exist that enable a user to control external systems by bodily movement, including movement of the tongue, jaws, and head. However, many of these devices provide for only a single degree of freedom and whose output is a simplistic binary signal indicating an ON/OFF condition. Accordingly, an intraoral device utilizing multiple degrees of freedom provided by manipulation of a user's oral cavity, wherein each degree of freedom further provides a continuous modulation function, may be desirable.

SUMMARY

Methods and apparatus for controlling an external device via at least one signal modulated by movement of a user's tongue, maxillaries, and facial features may include a mouthpiece comprising a controller and at least one signal generator and one signal detector.

Movement of a user's tongue, maxillaries, and facial features may alter the volume of the oral cavity, the size and shape of the mouth opening, the distance and relative position between the roof and floor of the mouth, the shape and position of the tongue, and other feature of the user's oral cavity. A signal generated by the at least one generator may be modulated by these changes to the geometry of the oral cavity and detected by at least one signal detector and demodulator. The detected signal may be further processed and transmitted to a remote device to provide control capability made possible by the degrees of freedom provided by the manipulation of the geometry of the user's oral cavity.

A method of orally controlling a device may comprise generating at least one excitation signal within an oral cavity, modulating the at least one excitation signal by manipulation of the oral cavity, detecting the at least one modulated excitation signal, and generating at least one device control signal based upon the detected signal.

Another aspect of the device may comprise means for generating at least one excitation signal within an oral cavity, means for detecting changes to the at least one excitation signal after being modulated by the oral cavity, and means for generating at least one device control signal based upon the detected changes.

In yet another aspect, an intra-oral device configured for controlling a remote device may comprise a mouthpiece comprising at least one assembly, the mouthpiece removably attachable to at least one of upper teeth and lower teeth, the mouthpiece having at least one interior surface. The mouthpiece may further include at least one signal emitter disposed on the at least one surface of the mouthpiece, the at least one signal emitter having an input. Furthermore, the mouthpiece may include at least one signal detector disposed on the at least one interior surface, the at least one signal detector having an output, the signal detector further operable to detect an output signal generated by the at least one signal emitter.

In addition, the mouthpiece may include at least one demodulator comprising an input and an output, the input of the demodulator configured to receive the output of the at least one signal detector, and the output operable to detect changes to the output signal generated by the at least one signal emitter as modulated by the oral cavity. Furthermore, the mouthpiece may include a controller operable to generate a control signal based upon the output of the at least one demodulator.

BRIEF DESCRIPTION OF THE DRAWINGS

Various exemplary embodiments are described in detail, with reference to the following figures, wherein.

DETAILED DESCRIPTION OF EMBODIMENTS

Methods and apparatus for modulating signals and controlling external devices based upon the geometry of a user's oral cavity may include a single or multi-bodied mouthpiece comprising control logic and at least one signal generator and detector. Signals emitted by the at least one signal generator/emitter may be modified by the position of the tongue, the maxillaries and/or the lips.

Movement produced by the contraction or relaxation of a single muscle represents a mechanical degree of freedom. When at least one degree of freedom has become non-functional, for example by injury or disease, other degrees of freedom, i.e., another physical movement, may be used in its place to control a connected device, provided that an appropriate translation technology is available. For example, handicapped people deprived of their use of leg muscles can move around by using their hands to push the wheels of a wheelchair, or to control servo motors, if available, by means of a joystick. In another example, a painter without control of arm or hand muscles can still paint by holding the brush handle in their mouth and moving the bristles across the canvas with head and jaw movements.

Contracting and relaxing jaw and facial muscles, enables one to change the spatial geometry of the oral cavity and its exit opening, the mouth. In turn, the spatial geometry of the oral cavity may be used to modulate natural excitation signals propagating through the oral cavity. Sound energy generated by the vocal cords, for example, is a natural type of excitation signal, which when modulated by the oral cavity, is transformed into speech.

Figure 1:
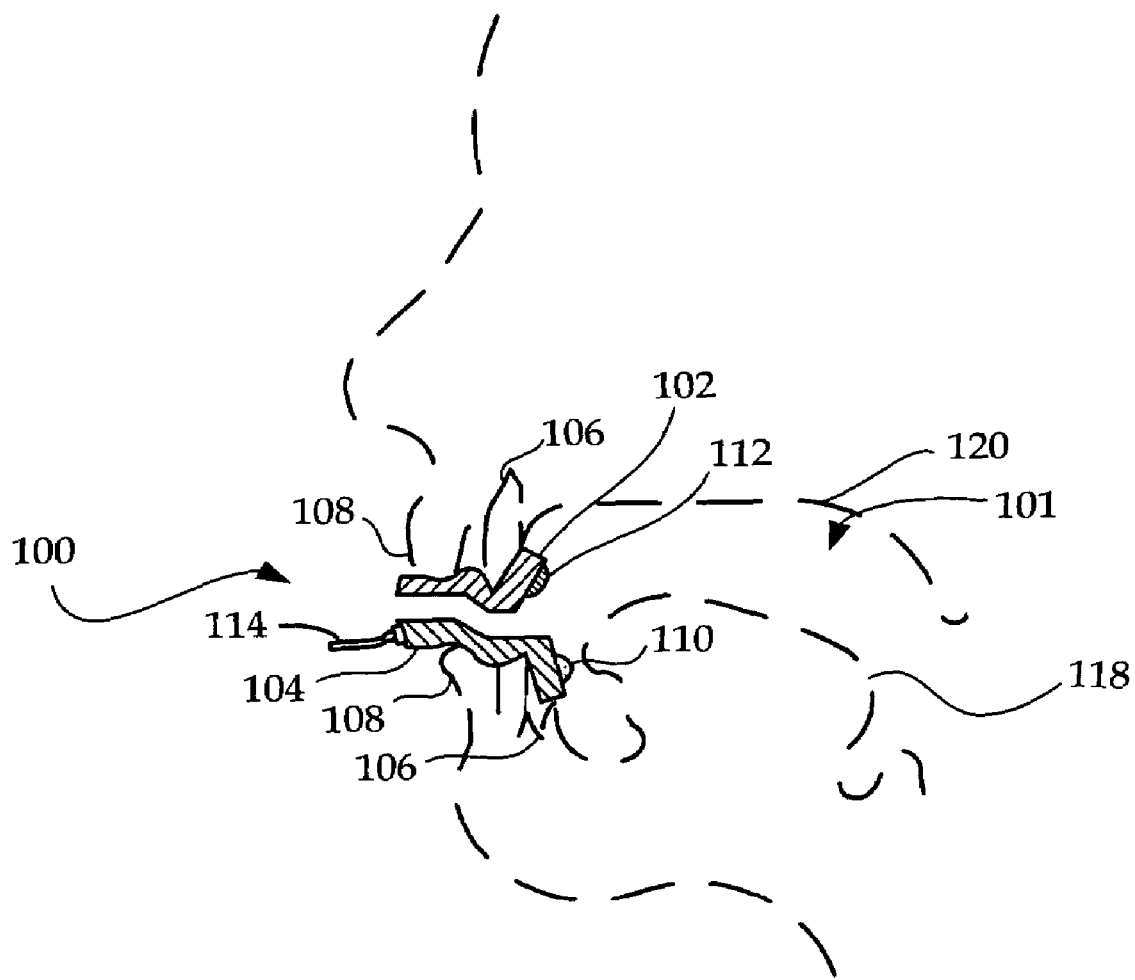
FIG. 1 is a cross-section of a two piece intraoral signal modulator and controller.

FIG. 1 illustrates one aspect of an intraoral signal modulator and controller comprising a mouthpiece 100. Via manipulation of the spatial geometry of a user's oral cavity, a user may control an external device, for example, a musical instrument, a mechanical aid, such as wheelchair, and a voice synthesizer. As disclosed herein, signal emitters 110 and signal detectors 112 operate to produce at least one control signal that may be transmitted wirelessly to the external device. In some embodiments, mouthpiece 100 may include antenna 114 to aid in the transmission of control signals to the external device. In other embodiments, the mouthpiece 100 may be connected to the external device via a cable.

Figure 2:
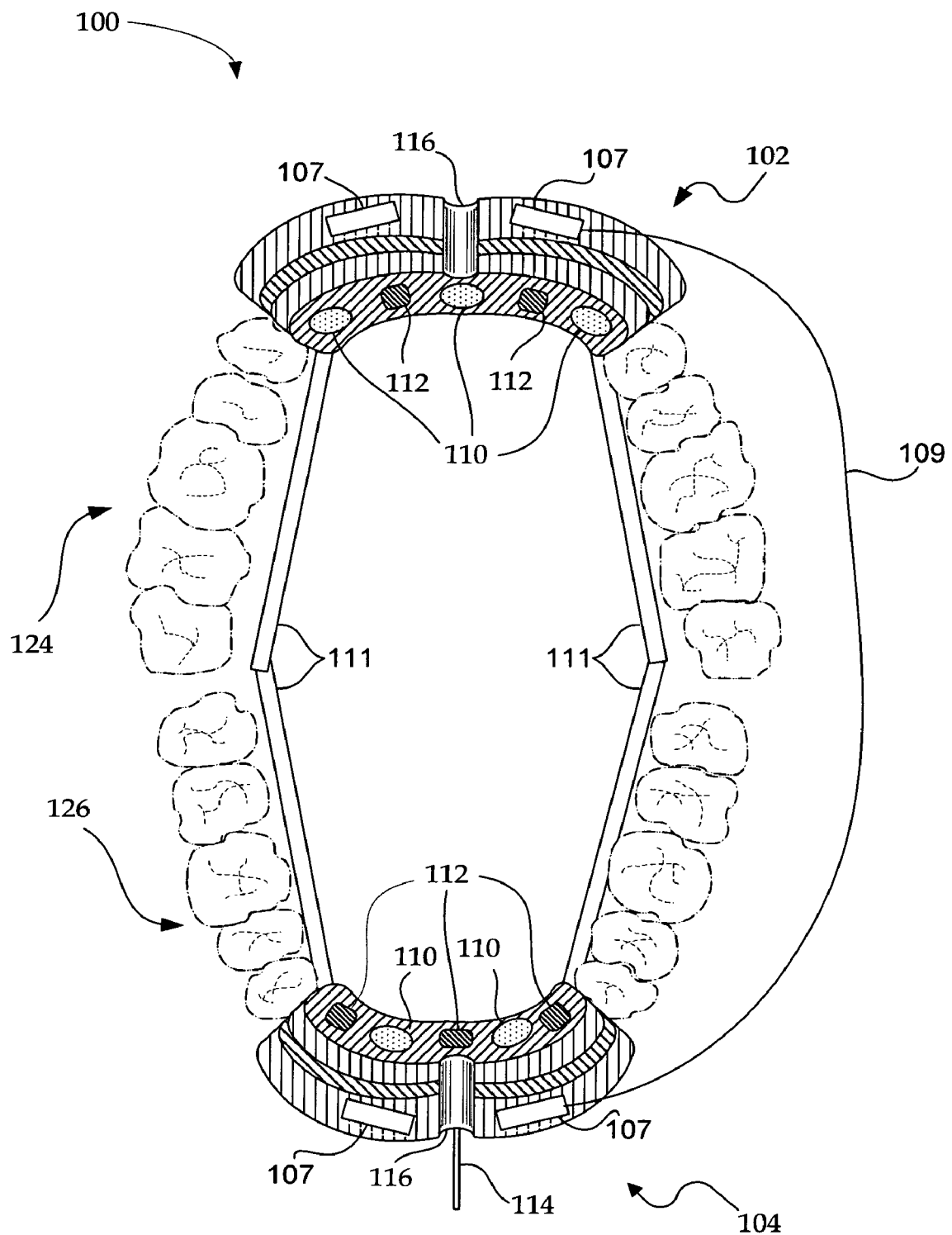
FIG. 2 is a detailed illustration of the intraoral signal modulator and controller according to the device in FIG. 1.

As shown in FIG. 1 and in more detail in FIG. 2, some embodiments of an intraoral signal modulator may include an upper assembly 102 and a lower assembly 104. The upper and lower assemblies 102, 104 may be formed of molded plastic or other material and may be held in place by the user's teeth 106 and lips 108. Upper and lower assemblies 102, 104 may be custom molded to an individual's mouth or may be manufactured in different sizes to accommodate a range of different mouth configurations.

Mouthpiece 100 may further include an air opening formed by recesses 116 in the upper and lower assemblies 102 and 104, respectively, enabling a user to inhale and exhale with their mouth closed and without shifting the position of the mouthpiece 100. Furthermore, in some embodiments, the upper assembly 102 may be connected to the lower assembly 104 by connecting member 111. The connecting member 111 may, for example, comprise a hinge mechanism, and/or be composed of a flexible material.

Mouthpiece 100 may further comprise at least one control assembly 107, and at least one signal emitter 110 and detector 112 embedded within upper assembly 102 and lower assembly 104. Non-limiting, the signal emitters 110 and signal detectors 112 may be placed in either the upper or lower assembly and in any configuration that enables energy emitted by emitters 110 to be modulated by the oral cavity and detected by detectors 112. For example, in some embodiments the emitters and detectors may be interleaved and be of an equal number whereas other embodiments may comprise more or fewer signal detectors 112 than signal emitters 110.

Figure 3A:
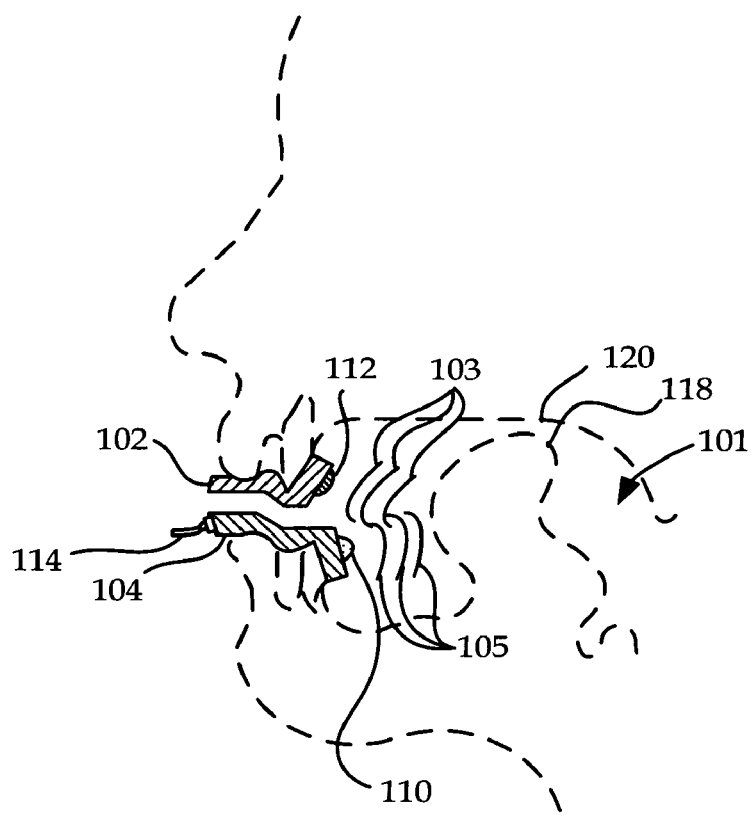
FIGS. 3A-3C illustrate the effects of different mouth and tongue positions on the signals generated by the two piece intraoral signal modulator and controller according to the device in FIG. 1.
Figure 3B:
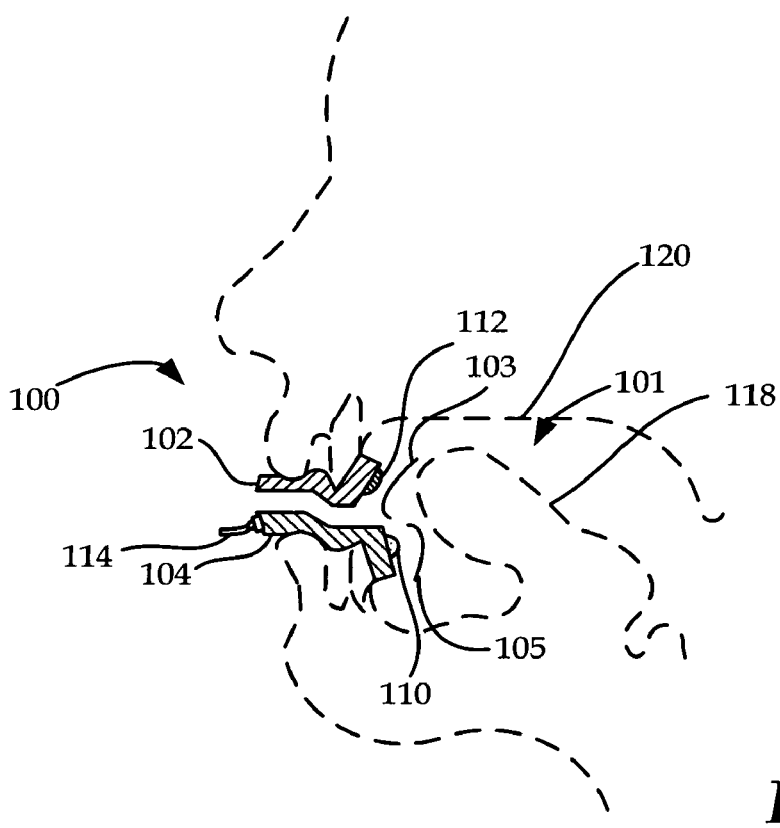
Figure 3C:
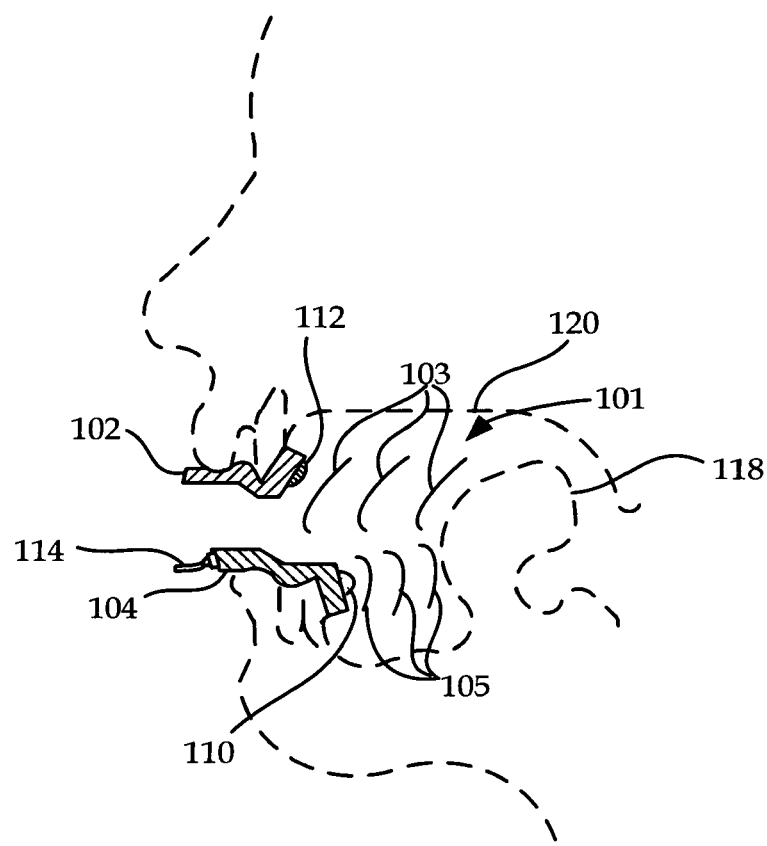

FIGS. 3A, 3B and 3C illustrate an environmental schematic of an orally inserted mouthpiece 100 operable to determine the effect of movements of the tongue 118, maxillaries, and the facial muscles on signals generated by the mouthpiece 100. These movements may vary the geometry of oral cavity 101 and a signal introduced into cavity 101 may, by single or multiple reflections, as well as by signal absorption properties of the walls 120 of the oral cavity, modify at least one parameter of a signal emitted by emitter 110. Parameters modified by changing the oral cavity may include, but are not limited to, amplitude, frequency and phase of the signals generated.

Figure 4:
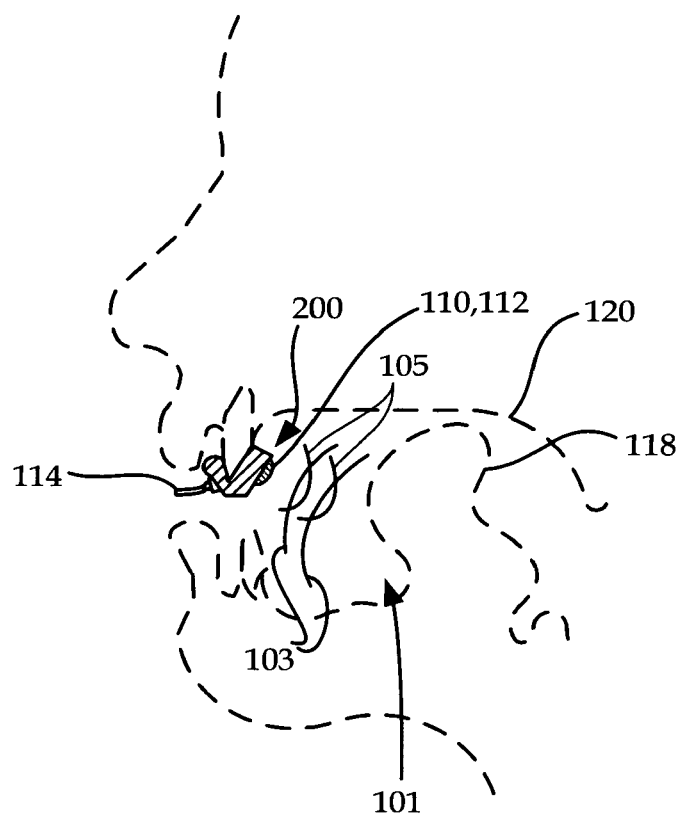
FIG. 4 illustrates a one-piece embodiment of an intraoral signal modulator and controller.
Figure 5:
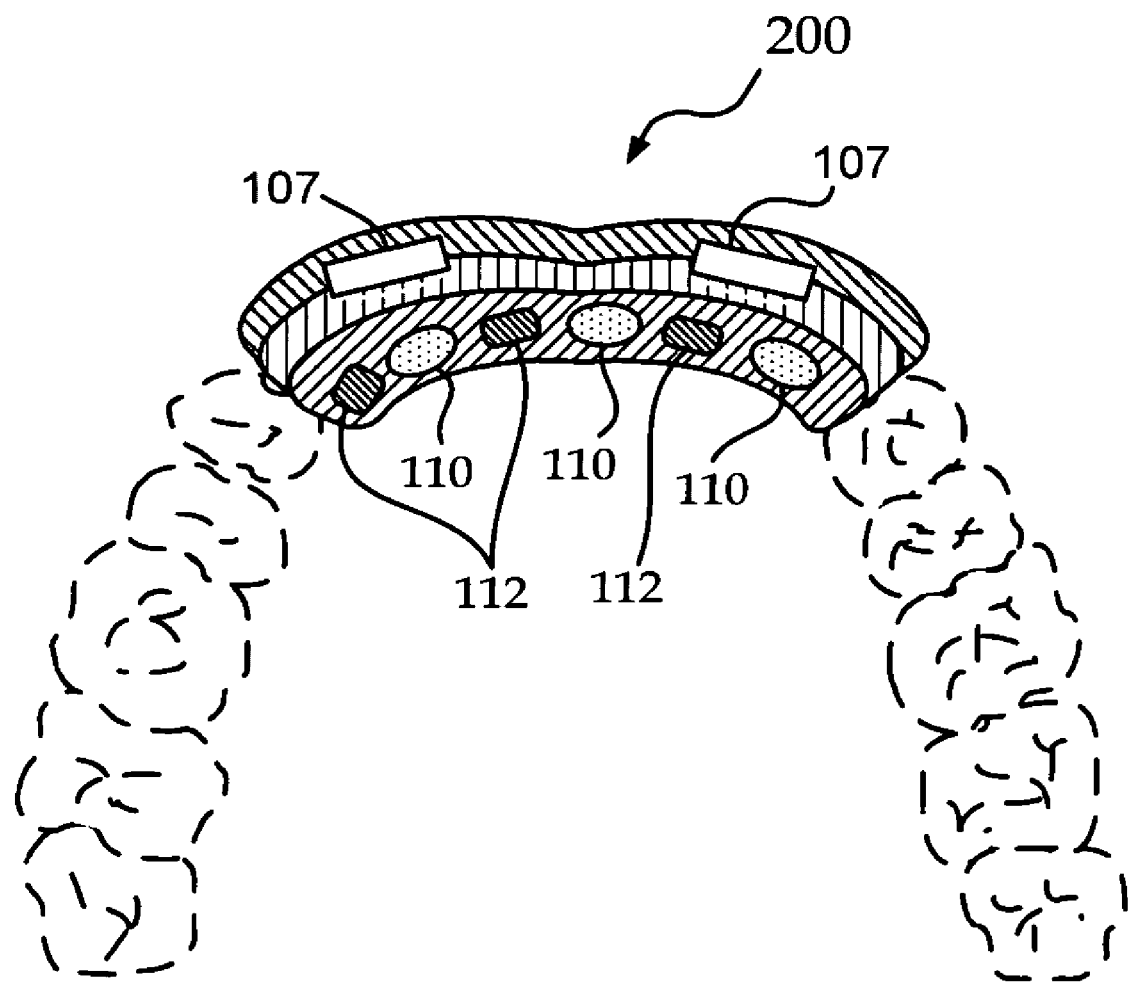
FIG. 5 is a top view of an intraoral signal modulator and controller according to the device of FIG. 4.

FIGS. 4 and 5 illustrate another aspect of the oral signal modulator and controller comprising a single assembly 200 having at least one emitter 110 and detector 112 embedded thereon. The position of the at least one emitter 110 and detector 112 is non-limiting and may be alternately disposed about on the surface of the mouthpiece 200. The single mouthpiece 200 may be held in place by the user's teeth and maxillaries, and may be disposed in the upper or lower portions of the mouth. Emitters 110 and detectors 112 may operate in pairs, each pair being tuned to a different frequency.

Figure 6:
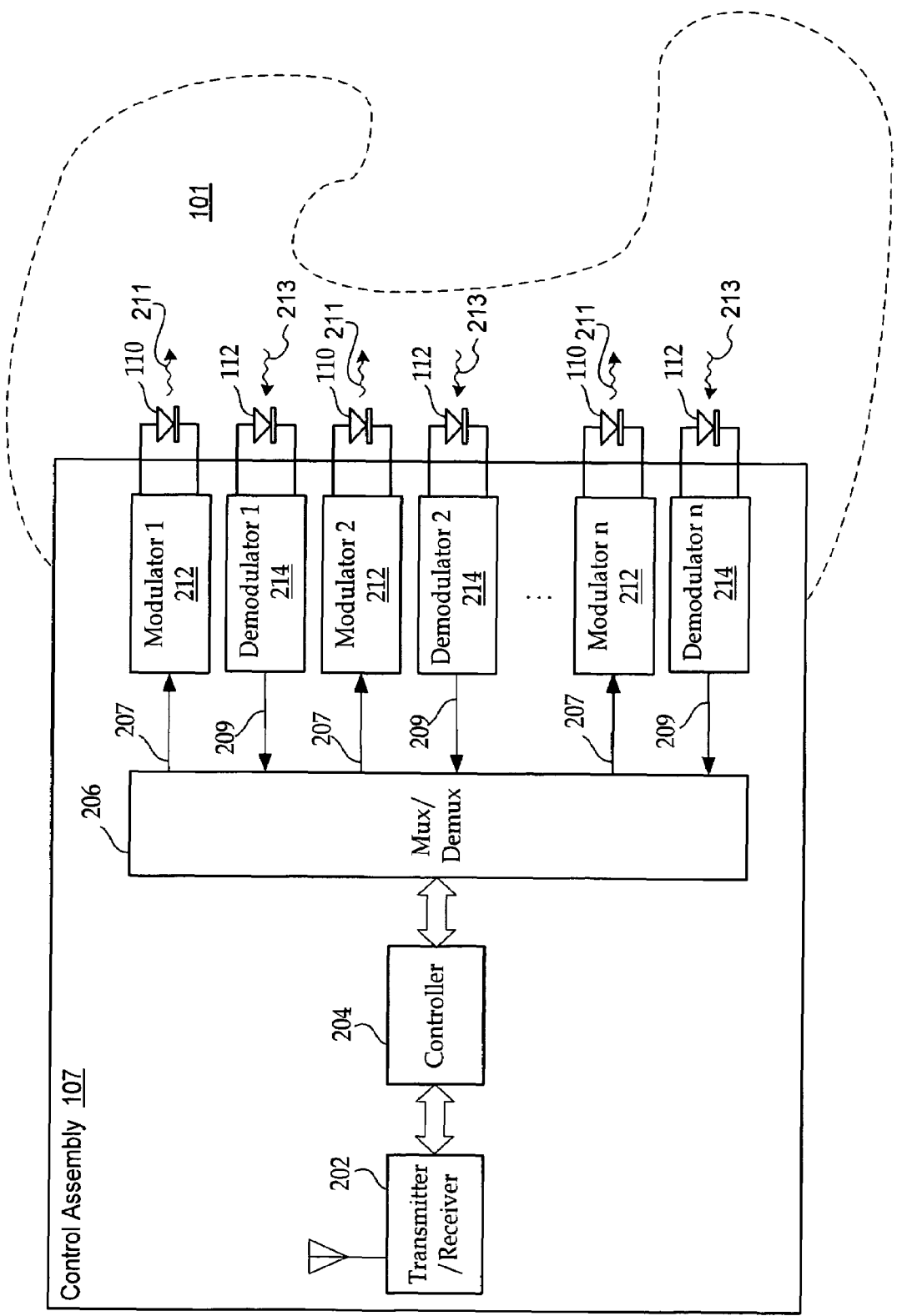
FIG. 6 is a block diagram of an intraoral signal modulator and controller according to FIG. 1.

FIG. 6 illustrates an exemplary embodiment of a mouthpiece 100 configured to control the operation of a remote device, i.e., a sound system, a wheelchair, and any device that may require controlling inputs. Non-limiting, a communications link between the mouthpiece 100 and the external device may be wired or wireless and may include, but is not limited to: an infrared network such as an Infrared Data Association ("IrDA")-based network; ultrasonic, a short-range wireless network; a Bluetooth® technology network; a ZigBee® protocol network; an ultra wide band ("UWB") protocol network; and a home radio frequency ("HomeRF") network.

In one aspect of mouthpiece 100, control assembly 107 may comprise a wireless transceiver 202 and antenna 114 disposed in at least one of the upper and lower assemblies 102 and 104 to enable signal transmission and reception from the mouthpiece 100 to and from at least one remote device. Mouthpiece 100 is not limited to communicating with one remote device and may receive excitations from one remote device while transmitting control signals to another device.

Signals originating from an external source may comprise multiple signals multiplexed in a single bit stream received by transceiver 202. Control assembly 107 may comprise multiplexer/demultiplexer 206, operable, under control of controller 204 to rout excitation signals 207 to the proper modulator 212 and emitter 110. Furthermore, the multiplexer portion of multiplexer/demultiplexer 206 may be operable to receive demodulated signals 209 from demodulators 214 and combine them into a signal which under control of controller 204 is forwarded to transceiver 202 for transmission to the externally controlled device. In other embodiments, signals received or generated by mouthpiece 100 may be carried on separate leads and may not require multiplexing and/or demultiplexing.

Controller 204 may be an application-specific integrated circuit ("ASIC"), or other chipset, processor, logic circuit, or other data processing device. Controller 204 may also include memory, which may comprise volatile and nonvolatile memory such as read-only and/or random-access memory (RAM and ROM), EPROM, EEPROM, flash, or any memory common to computer devices.

Furthermore, modulator 212, emitter 110, detector 112 and demodulator 214 may be based upon any suitable signal transmission technology, including but not limited to audio, RF, ultrasound, and infrared technologies. In some embodiments, such as illustrated in FIG. 6, emitter 110 may comprise a light emitting diode (LED), each LED being driven by an amplitude, frequency or phase modulator 212. A detector operable to detect emitted signals, such as by LED emitter 110 may include photo detector diode 112. Different emitter-detector pairs may operate at different carrier frequencies.

Circuitry comprising modulators, demodulators, multiplexers, demultiplexers, controllers and transceivers are known in the field of signal processing and the block diagrams disclosed herein are non-limiting. Furthermore, advances in digital signal processing will determine the specific components used to implement the intraoral signal modulator and controller described herein.

Electrical components in upper assembly 102 may be in electrically communication with components in lower assembly 104 via a wireless link or by a wired link, for example by a separate cable 109 or imbedded in connecting assembly 111.

In some embodiments, such as illustrated in FIG. 6, modulator input signal 207 may be derived from a remote device received through a receiver section of transceiver 202 and routed to a specific modulator 212 under control of controller 204 and multiplexer/demultiplexer 206. In other embodiments, excitation signal 207 may be generated in mouthpiece 100 by components disposed on control assembly 107, reducing transceiver 202 to a transmitter with no receiver section.

Each detected signal may comprise multiple characteristics modulated by manipulation of oral cavity 101 and each characteristic may drive a separate control lead. For example, such signal characteristics may include, but are not limited to amplitude, frequency, and phase.

In some embodiments, controller 204 may generate external device control signals based upon a detected signal characteristic at a specific instant in time. In other embodiments, controller 204 measures the relative change in characteristics as opposed to an instantaneous measurement.

As previously disclosed, a transmitted luminous signal 211 may, upon propagation through oral cavity 101, be transformed into signal 213 which may be detected by the appropriate photodiode 112. The output of photodiode 112 may be serve as input to demodulator 214, and the demodulated signal 209 may then be relayed to the transmitter section of the transceiver 202 through the multiplexer/demultiplexer 206 under control of controller 204.

Figure 7:
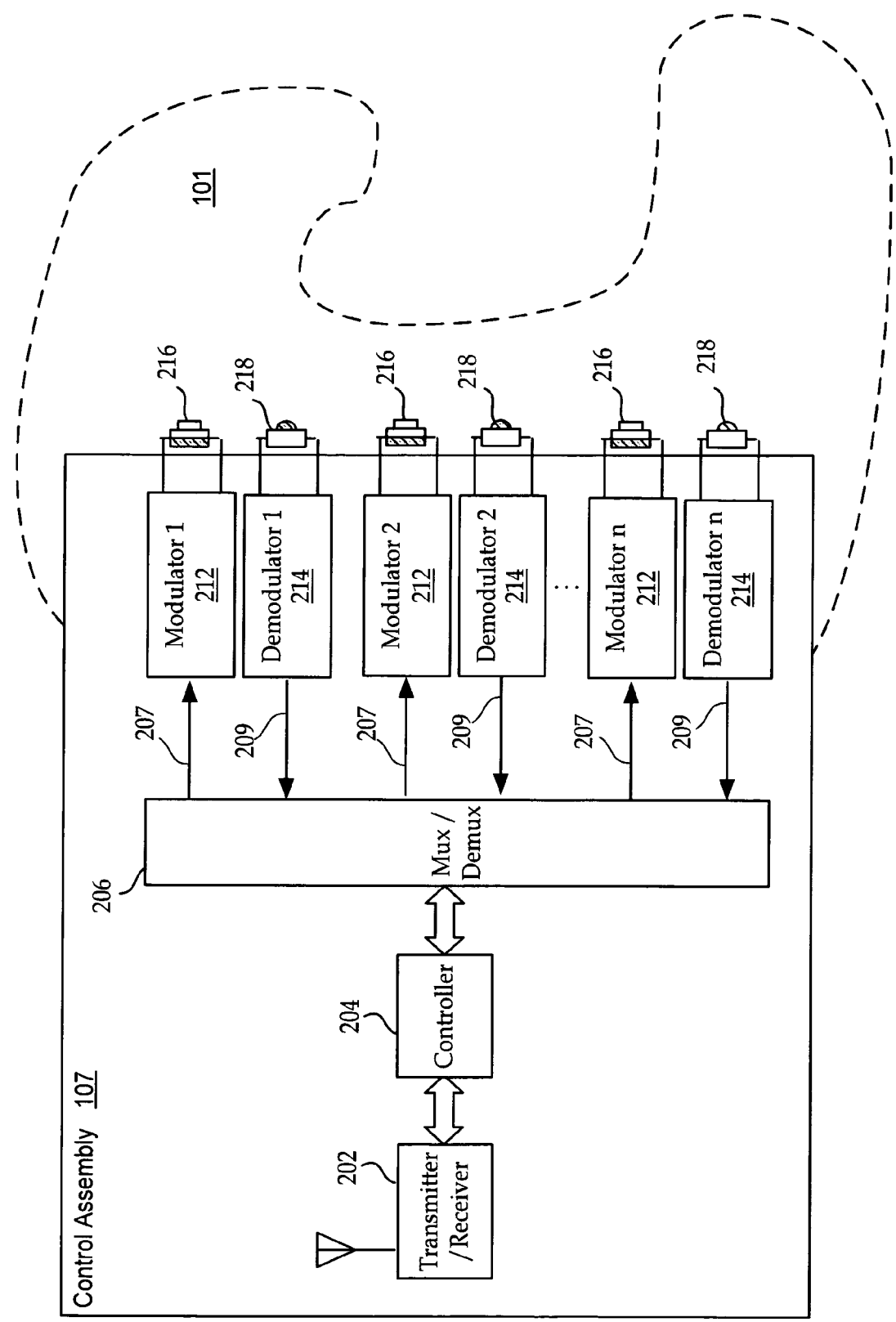
FIG. 7 is a block diagram of another aspect of the intraoral signal modulator and controller according to FIG. 1.

In other embodiments, such as illustrated in FIG. 7, intraoral signal modulator and controller 100 may comprise sonic or ultrasonic generators 216, matching sonic or ultrasonic detectors 218, and matching modulators 212 and demodulators 214. The use of sonic or ultrasonic signals with wavelengths of the same order of magnitude as the dimensions of oral cavity 101 may enable the use of phase modulation, which offers a higher degree of control when compared to amplitude or frequency modulation. The increase in level of control is due to the fact that the phase shift experienced by the excitation signal when reflected by the surface 120 of the oral cavity is precisely determined by the distance between the emitter 110, the detector 112, and the surface 120 of the oral cavity. Therefore even slight movements of surface 120 in relation to emitter 110 and detector 112 may result in a measurable modulation of the generated signals.

Figure 8:
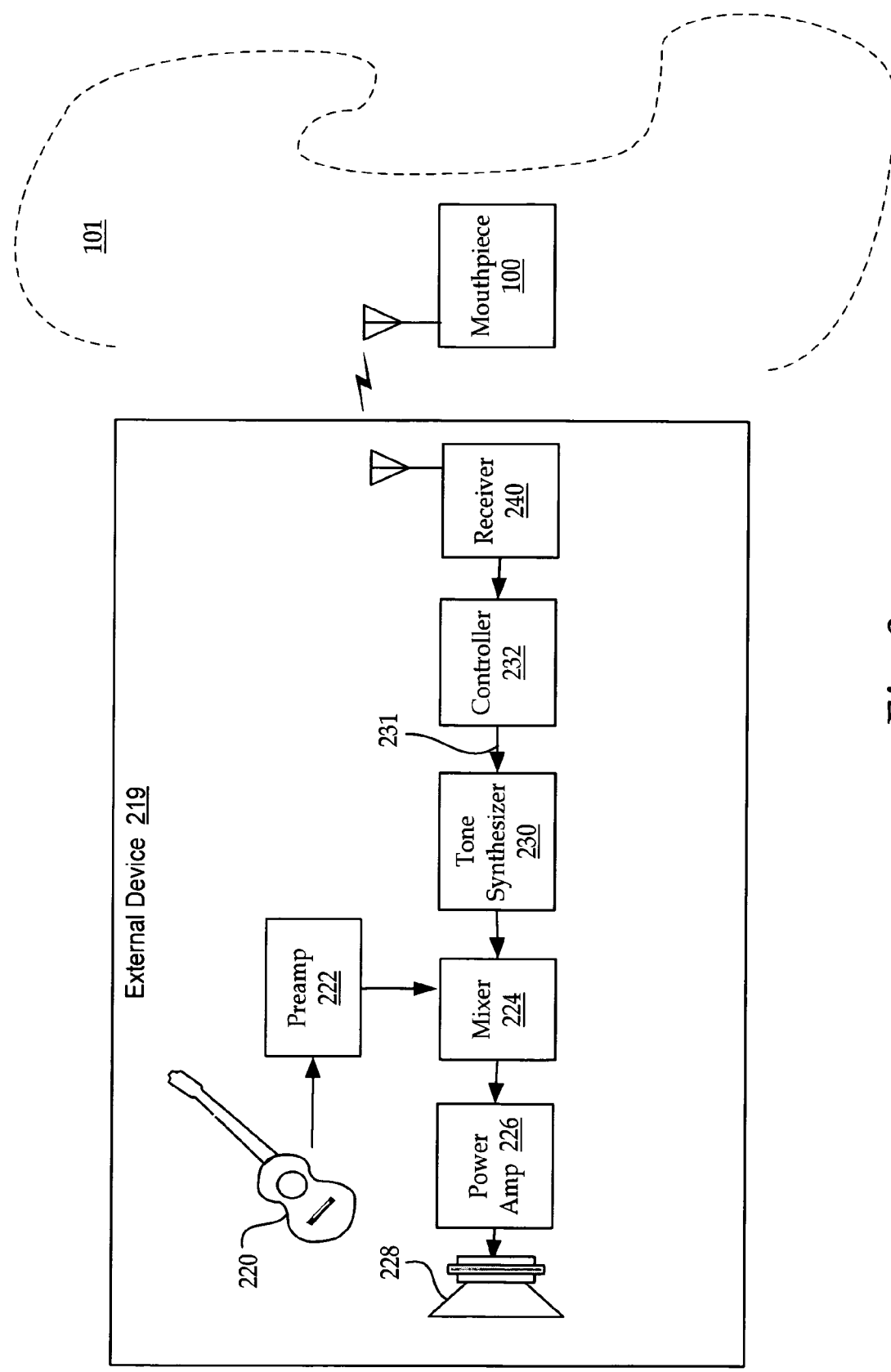
FIG. 8 is a block diagram of an audio production apparatus according to the device of FIG. 1.

FIG. 8 illustrates a musical apparatus comprising mouthpiece 100 inserted into oral cavity 101 operable to create new tones through movement of a user's tongue, maxillaries and facial muscles. External device 219 may, by operation of receiver 240, receive control signals from mouthpiece 100. Under control of a software application resident in the memory of controller 232, a signal may be transmitted to tone synthesizer 230, that may be combined by mixer 224 with signals from other devices, i.e., output of musical instrument 220 amplified by preamplifier 222. The output of mixer 224 may then be amplified by power amplifier 226 before being fed into speaker 228. Preamplifier 222, mixer 224, power amplifier 226 and speaker 228 are known to those knowledgeable in the field of audio engineering and the schematic of FIG. 8 is non-limiting.

Figure 9:
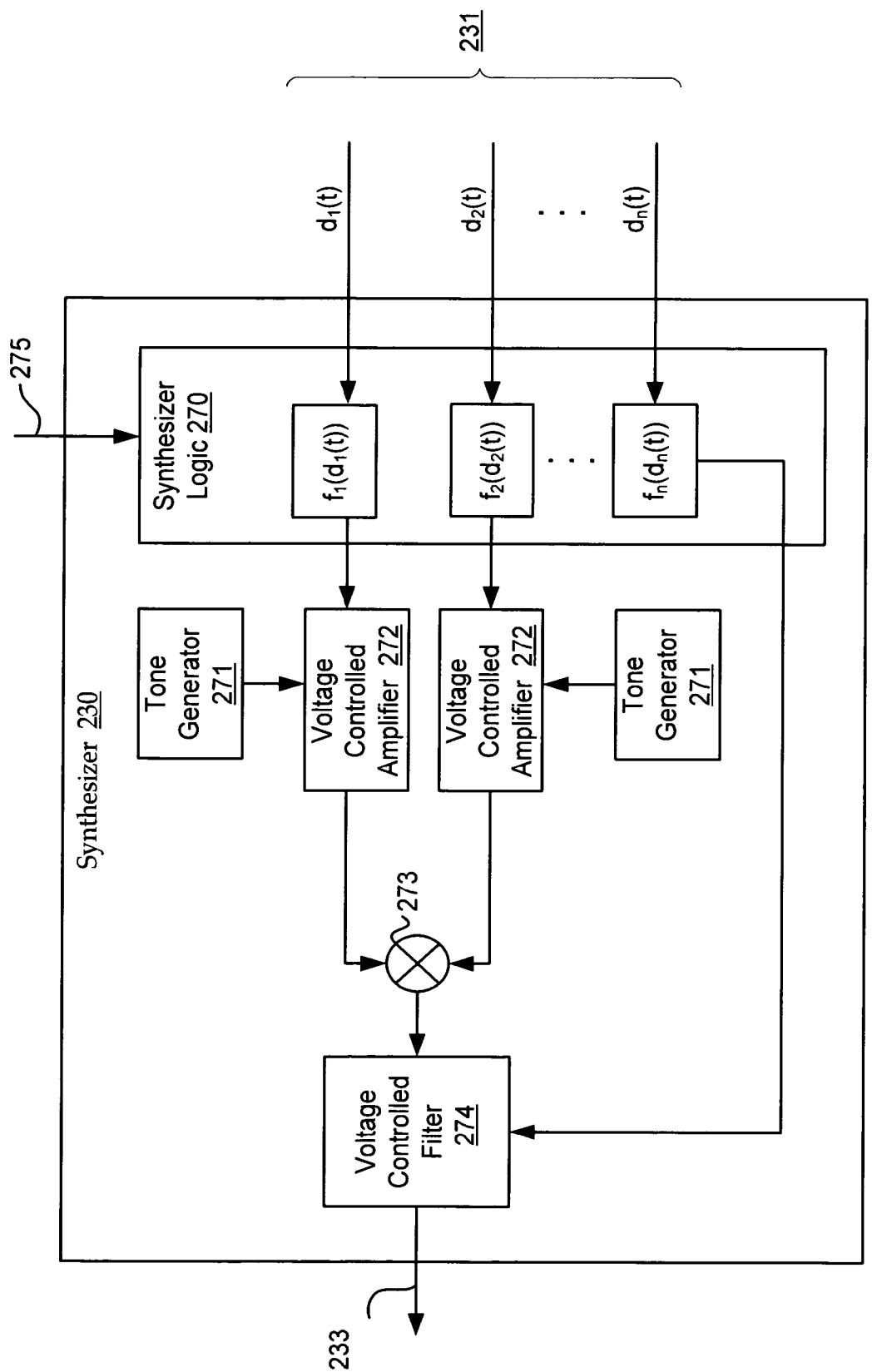
FIG. 9 is a block diagram of an audio synthesizer according to the apparatus of FIG. 8.

As shown in FIG. 9, some embodiments of synthesizer 230 may include one or more tone generator 271, voltage controlled amplifier 272, mixer 273, and voltage controlled filter 274. Input signals 231, processed by controller 232, may comprise signals $d_1(t), d_2(t)$, through $d_n(t)$, and may generally correspond to signals 209 detected and demodulated by mouthpiece 100 after being modified by oral cavity 101.

The synthesizer logic 270 may execute a predetermined transformation of at least one input signal 231, the transformation may be configurable and may comprise a function, i.e., $f_1(d_1(t))$, $f_2(d_2(t))$, and $f_3(d_3(t))$, of amplitude, frequency, a mix of amplitude and frequency, etc. The exact function may be determined by a set of coefficients stored in a memory of synthesizer logic 270, or may be entered, as a set of inputs 275, by a musician based upon their experience or by experimentation. For example, if $d_1(t)$ and $d_2(t)$ correspond to the outputs of adjacent detectors 112, moving the tongue from the proximity of detector to the proximity of the other detector may result in an output exhibiting a shift in tone weight from one frequency to another. The implementation of these devices in combination with mouthpiece 100 may enable a musician to augment the degrees of freedom normally used in playing a musical instrument with the additional degrees of freedom provided by the tongue, maxillary and facial muscles.

Figure 10:
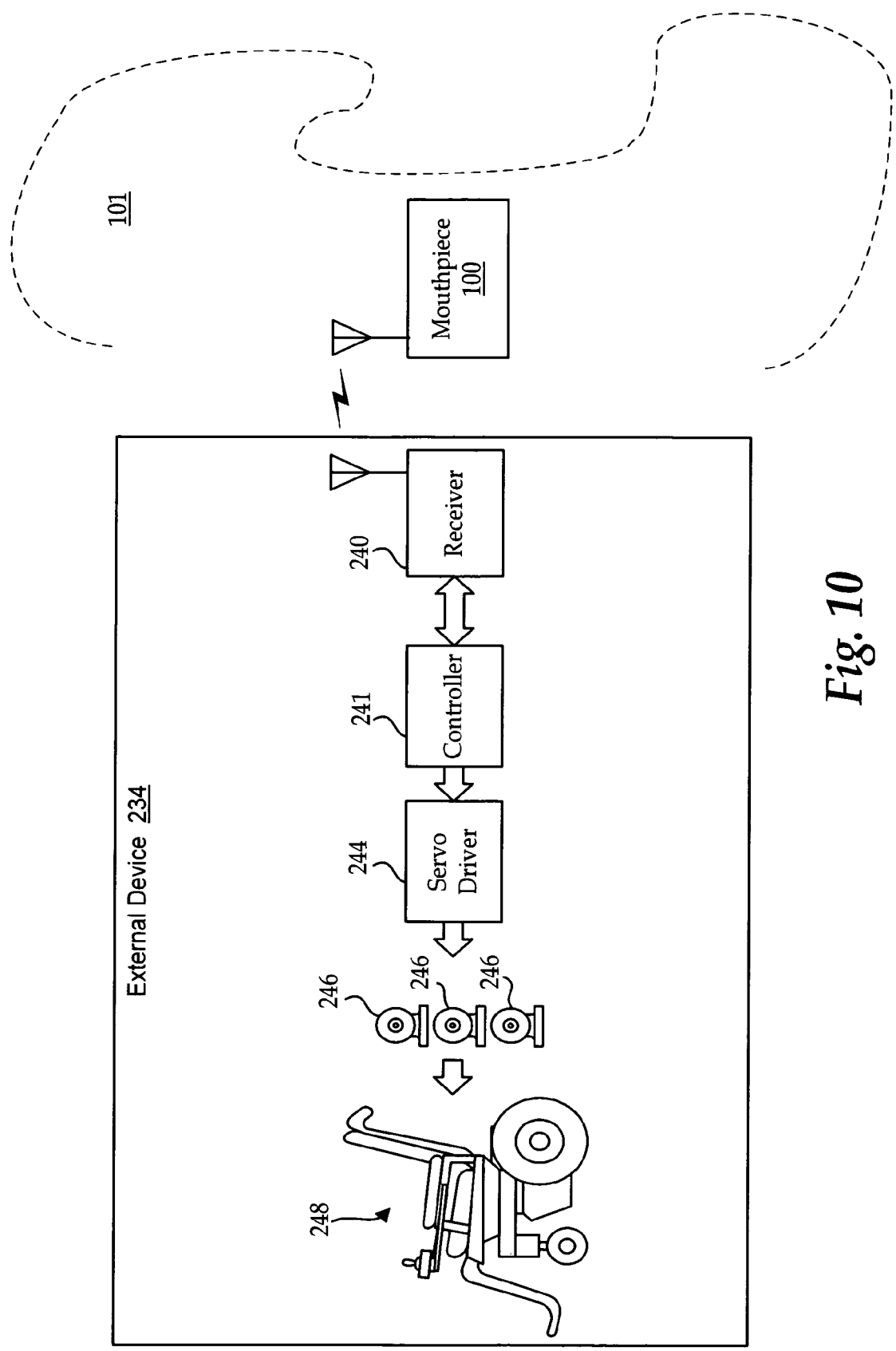
FIG. 10 is a block diagram of a wheelchair controlling apparatus according to the device of FIG. 1.

FIG. 10 illustrates an external device 234 operable by a user to control movement of a wheelchair 248 by movement of their tongue, maxillary and facial muscles. Comprising controller 241, servo driver 244, and servos 246, signals from mouthpiece 100 may be transmitted by transmitter 202 to receiver 240 and processed by controller 241. Application software resident in memory of controller 241 may execute a control mechanism similar to synthesizer 230 of FIG. 9. The output of controller 241 is operable to generate input signals to at least one servo driver 244, which may feed at least one servo motor 246 mounted on wheelchair 248.

Figure 11:
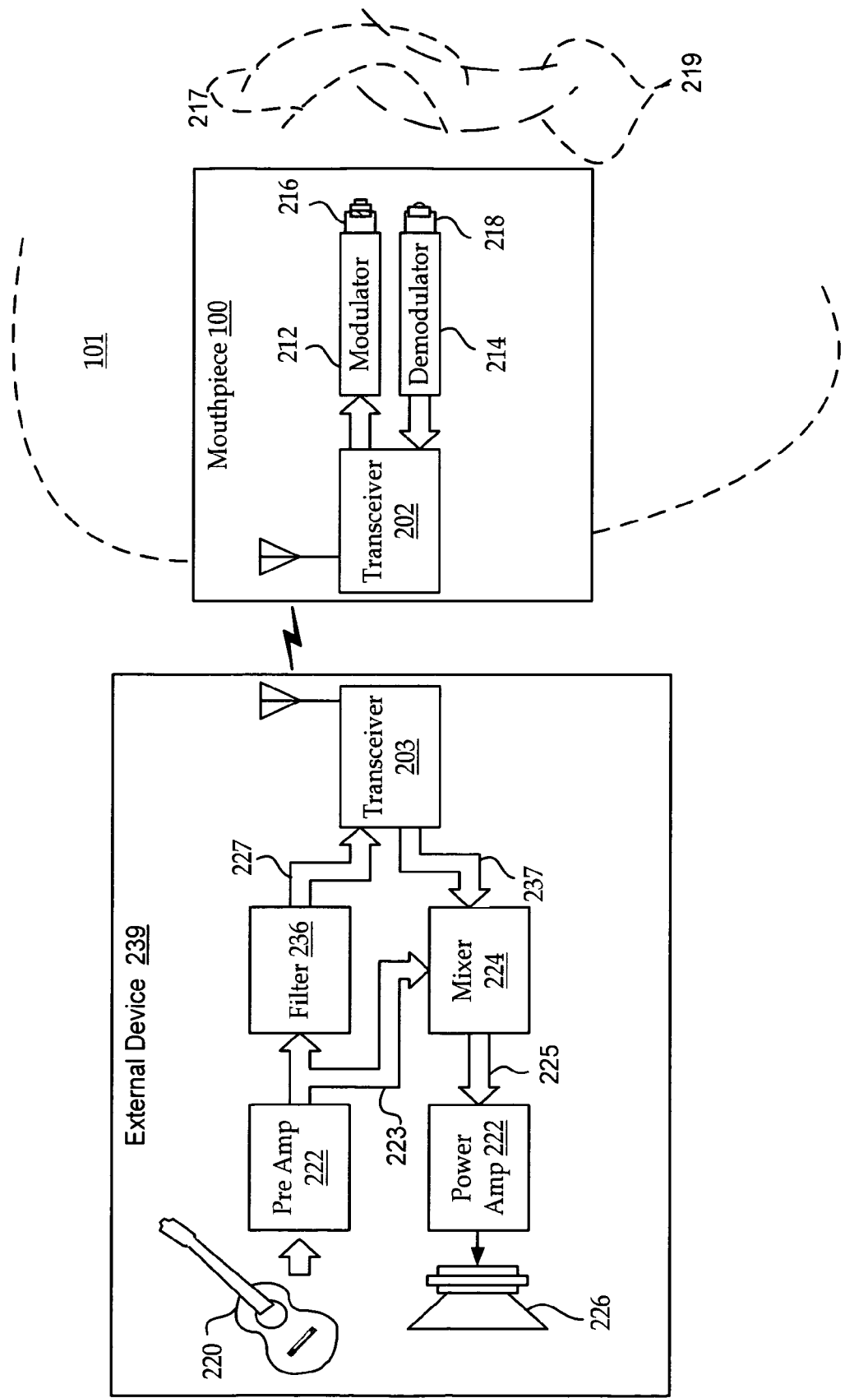
FIG. 11 is a block diagram of another musical apparatus according to the device of FIG. 1.

FIG. 11 illustrates another embodiment of the intraoral signal modulator and controller may be used to control an external device 239 whereby an output 223 of a musical instrument 220 may be mixed with an oral cavity modulated signal 237. In some embodiments, the apparatus of FIG. 11 may be used to "WAH" low frequencies, "TREMOLO" high frequencies, etc. A select frequency band of the musical instrument output 223 may be processed by filter 236 and transmitted by transceiver 203 to mouthpiece 100 where tones 217 may be generated by modulator 212 and generator 216.

Through movements of the tongue, maxillaries and facial muscles, a user of mouthpiece 100 may create modulated tones 219 which may be detected and demodulated by detector 218 and demodulator 214. Mouthpiece transceiver 202 may transmit the demodulated signals to external device transceiver 203. Output 237, of transceiver 203 may be forwarded to mixer 224 to be combined with the unaltered tones 223 generated by the musical instrument 222. The combined output 225 of mixer 224 may then be amplified by power amplifier 222 and applied to speaker 226.

Figure 12:
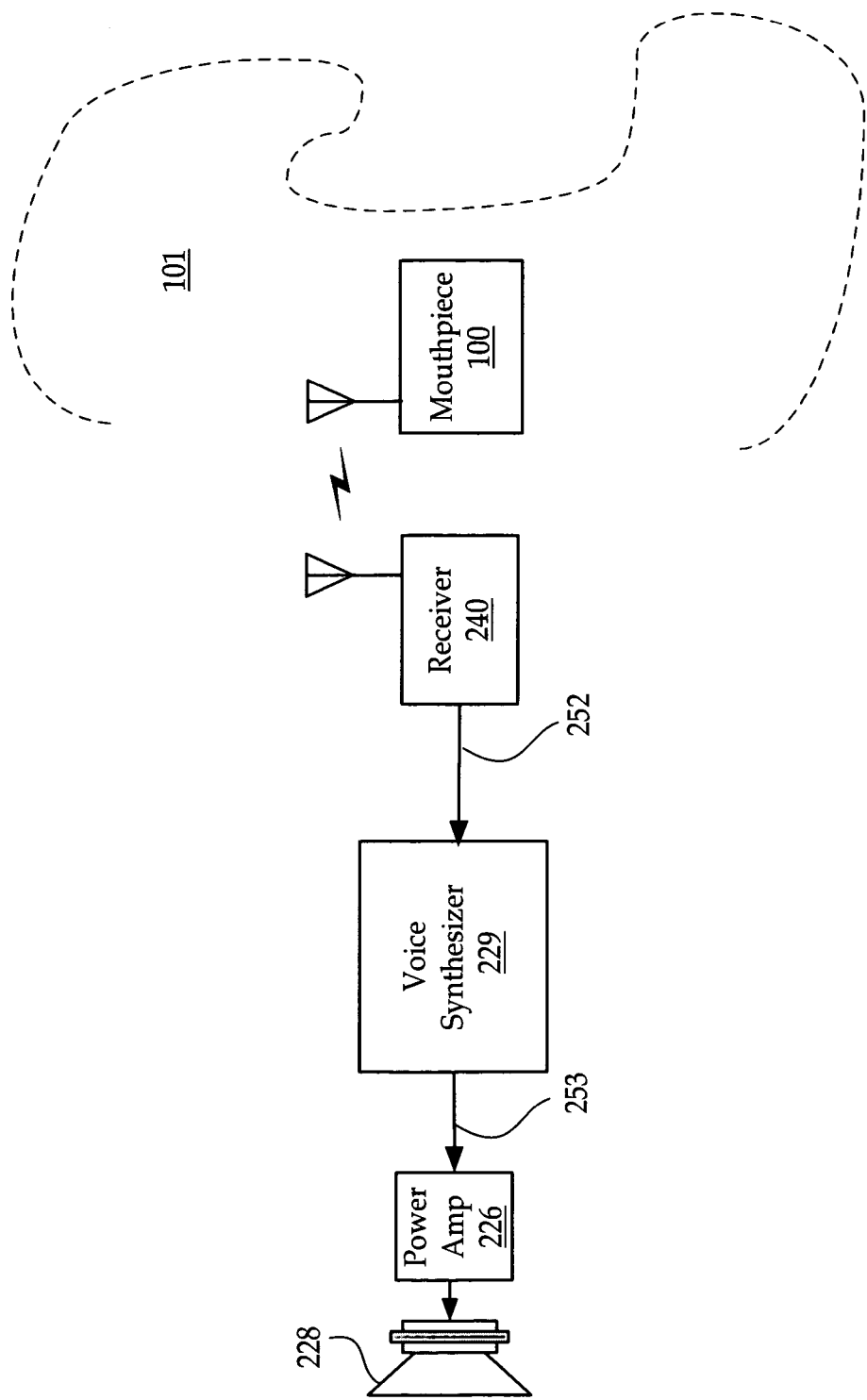
FIG. 12 is a block diagram of a voice synthesizer apparatus according to the device of FIG. 1.

FIG. 12 illustrates a voice synthesizing apparatus comprising mouthpiece 100 and voice synthesizer 229 operable to produce a speech signal 253. Control signals 252, generated by mouthpiece 100 based upon manipulation of the user's oral cavity, are applied to synthesizer 229. Synthesizer 229 operates to map oral geometry to a phoneme or voice unit. The output of voice synthesizer 229 may generate an audible signal representative of voice when outputted through power amplifier 226 and speaker 228.

Figure 13:
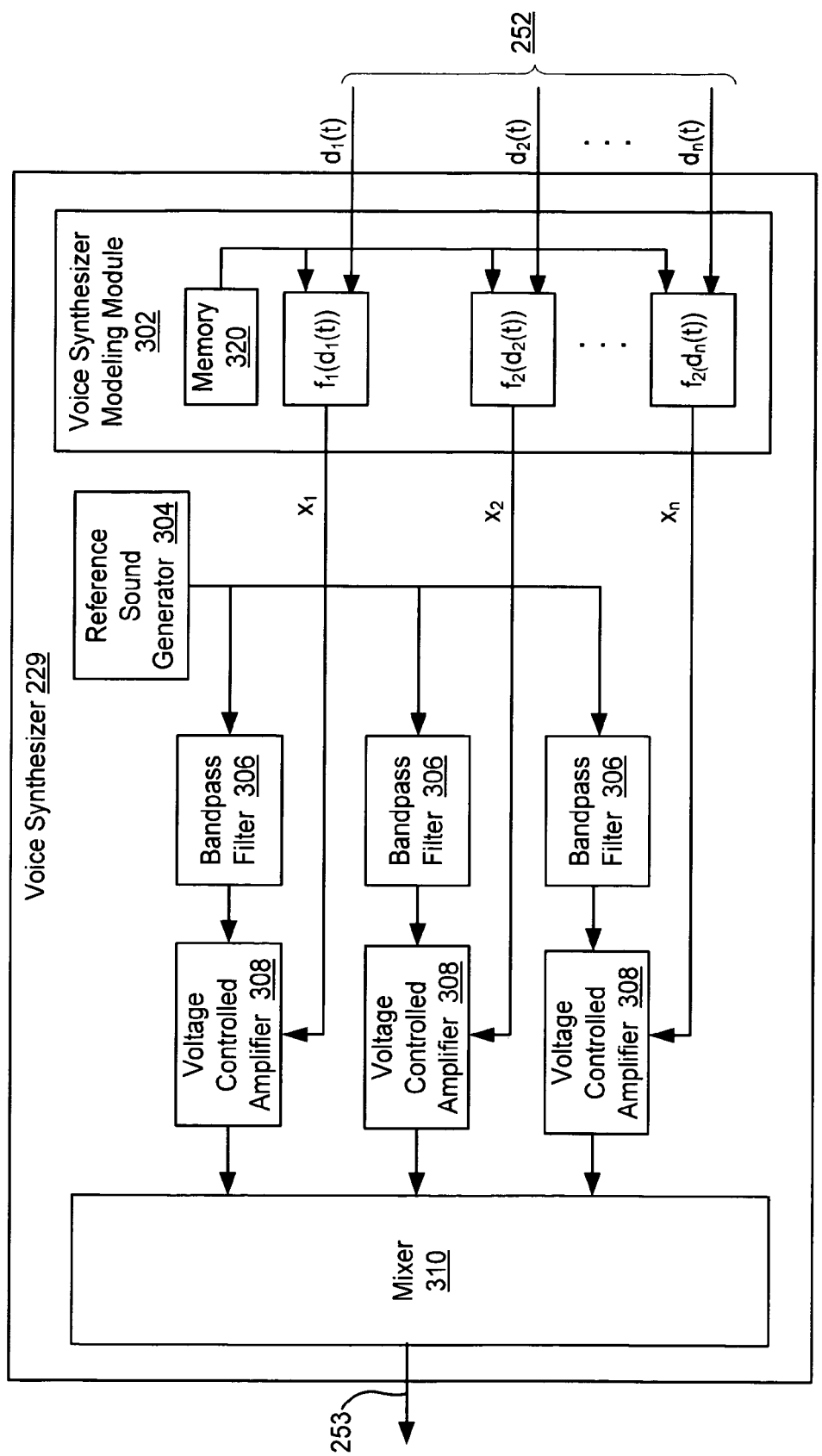
FIG. 13 is a block diagram of a voice coder type synthesizer according to the apparatus of FIG. 12.

FIG. 13 illustrates an exemplary voice synthesizer 229 comprising a reference sound generator 304 operable to span the frequency range common to voice, i.e., 100 Hz to 20 KHz). The output of the reference sound generator 304 may be sliced into sound frequency bands one quarter to one half octave apart by bandpass filters 306. The output of each bandpass filter 306 may then serve as an input to a voltage controlled amplifier 308 controlled by an output of a voice synthesizer modeling module 302. Voice synthesizer modeling module 302 may generate control signals $x_1$-$x_n$ using a digital signal processor or other type of processor or custom device based upon coefficients stored in memory 320.

Memory 320 may be loaded with a mapping of a particular oral geometry, or a sequence of specific oral manipulations, to a specific outputted phoneme using a variety of mechanisms, including, but not limited to, static loading at the time of manufacture, loading via a personal computer, and downloading into memory 320 via the Internet or other network. Furthermore, the mapping of oral geometry as used in voice synthesizer modeling module 302 may be accomplished using the intraoral signal modulator and controller thereby permitting the devices of FIGS. 12 and 13 to be configured to the specific oral geometry of a user.

Figure 14:
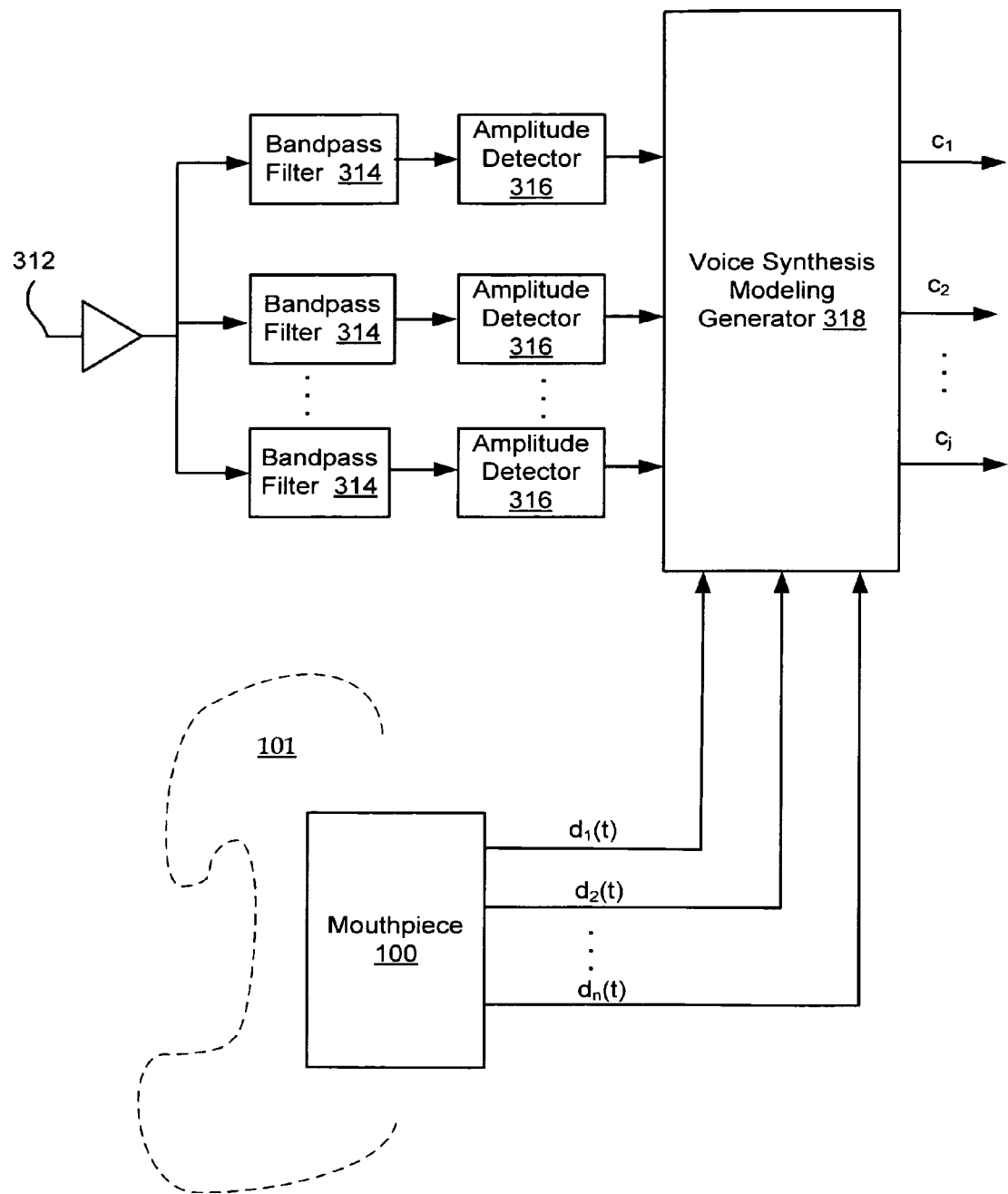
FIG. 14 is a block diagram of a voice synthesis modeling generator according to the device of FIG. 13.

FIG. 14 illustrates an exemplary embodiment of an apparatus operable to determine the coefficients $c_1$-$c_j$ to be stored in the memory 320 of voice synthesizer modeling module 302 as a user pronounces a library of voice units. As a user pronounces the voice units, coefficients $c_1$-$c_j$ may be determined by voice synthesizer modeling generator 318 using signals $d_1(t)$-$d_n(t)$ generated by mouthpiece 100 and voice signal 312 after the voice signal 312 is processed by bandpass filter 314 and amplitude detector 316. The mechanism described above may be performed once prior to using mouthpiece 100 to produce speech, or may be performed upon user request, for example, upon use by another user, or upon changes to the ability of the user to manipulate their oral cavity.

Figure 15:
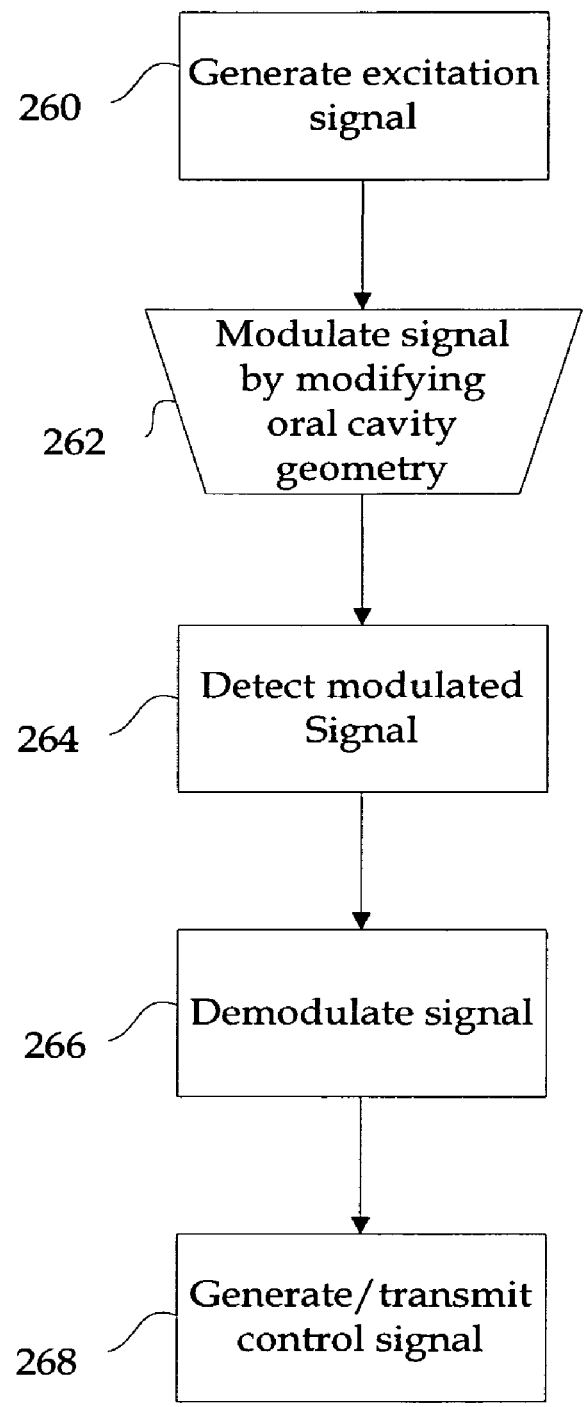
FIG. 15 is a flowchart of a method for controlling an external device according to the device of FIG. 1.

FIG. 15 is a flowchart of an exemplary method of controlling a remote device according to the intraoral apparatus of FIG. 1. At step 260, a signal may be introduced into an oral cavity, modulated by at least one modulator 212 and fed to an emitter, such as LED 110 as shown in FIG. 6.

The emitter may generate an audio signal, a luminous signal, an infrared signal, a sonic signal, and any other signal whose parameters may be modified, at step 262, by the oral cavity. For example, the amplitude, frequency and phase of the signal may be modulated by reflection and absorption by the surface of the oral cavity.

The modulated signal may, at step 264, be detected by signal detectors such as photoreceptor 112, shown in FIG. 6, and demodulated at step 266 by demodulators 214. The demodulated signal may then, under control of controller 204, be multiplexed with other signals and transmitted via transceiver 202 to the external device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An intraoral device, the intraoral device comprising at least one mouthpiece assembly removably attachable to at least one of upper teeth and lower teeth within an oral cavity, the at least one assembly further comprising:

at least one interior surface;

at least one signal emitter disposed on the at least one interior surface, the at least one signal emitter having an input and an output, the signal emitter configured to generate an output signal on the output of the signal emitter;

at least one signal detector disposed on the at least one interior surface, the at least one signal detector having an input and an output, the signal detector operable to detect at the input of the signal detector, the output signal generated by the at least one signal emitter and modulated by the oral cavity;

at least one demodulator comprising an input and an output, the input of the demodulator in electrical communication with the output of the at least one signal detector, and the demodulator operable to detect changes to the output signal generated by the at least one signal emitter as modulated by the oral cavity; and an intra-oral controller electrically connected to the output of the demodulator, the intra-oral controller operable to generate at least one control signal based upon the output of the at least one demodulator, the at least one control signal operable to control at least one operation of a remote device outside the oral cavity.

2. The device of claim 1, further comprising at least one modulator, the at least one modulator including an input and an output, the output of the modulator connected to an input of the at least one signal emitter.

3. The device of claim 1, further comprising a means for transmitting the control signal to the remote device.

4. The device of claim 1, further comprising a means for receiving an input signal from a remote device.

5. The device of claim 1, wherein the at least one signal emitter is configured to produce radio frequency signals.

6. The device of claim 1, wherein the at least one signal emitter is configured to produce infrared signals.

7. The device of claim 1, wherein the at least one signal emitter is configured to produce audible frequency signals.

8. The device of claim 1, wherein the at least one signal emitter is configured to produce a signal comprising a wavelength of a same order of magnitude as a distance from the at least one signal emitter and a surface of the oral cavity.

9. The device of claim 1, further comprising a voice synthesizer.

10. The device of claim 9, further comprising a voice synthesis modeling generator.

11. The device of claim 1, further comprising a musical instrument controlling apparatus.

12. The device of claim 1, further comprising a wheelchair controlling apparatus.

\* \* \* \* \*